(12) United States Patent
Feldner et al.

(10) Patent No.: US 12,683,335 B2
(45) Date of Patent: Jul. 14, 2026

(54) TEMPERATURE DETECTION DEVICE FOR A PLUG CONNECTOR PART

(71) Applicant: Phoenix Contact E-Mobility GmbH, Schieder-Schwalenberg (DE)

(72) Inventors: Ralf Feldner, Hornbad Meinberg (DE); Cedric Deppe, Doerentrup (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 454 days.

(21) Appl. No.: 18/247,650

(22) PCT Filed: Sep. 27, 2021

(86) PCT No.: PCT/EP2021/076460

§ 371 (c)(1),
(2) Date: Apr. 3, 2023

(87) PCT Pub. No.: WO2022/073782

PCT Pub. Date: Apr. 14, 2022

(65) Prior Publication Data

US 2023/0396027 A1 Dec. 7, 2023

(30) Foreign Application Priority Data

Oct. 7, 2020 (BE) .................................. 2020/5694

(51) Int. Cl.
H01R 13/66 (2006.01)
B60L 53/16 (2019.01)
H01R 43/24 (2006.01)

(52) U.S. Cl.
CPC .......... H01R 13/6683 (2013.01); B60L 53/16 (2019.02); H01R 43/24 (2013.01); H01R 2201/26 (2013.01)

(58) Field of Classification Search
CPC .................................................... H01R 13/6464
USPC ........................................ 439/620.18, 620.21
See application file for complete search history.

(56) References Cited

U.S. PATENT DOCUMENTS

| | | | | |
|---|---|---|---|---|
| 4,959,027 A | * | 9/1990 | Muzslay | ................ H01R 31/06 439/130 |
| 7,722,364 B2 | * | 5/2010 | Klinger | .................. H05K 1/189 439/83 |
| 10,985,507 B2 | * | 4/2021 | Rose | ..................... H01R 13/111 |
| 12,100,917 B2 | * | 9/2024 | Hille | .................... H05K 5/0069 |
| 2017/0229820 A1 | | 8/2017 | Fuehrer et al. | |
| 2017/0237205 A1 | | 8/2017 | Fuehrer et al. | |
| 2018/0097316 A1 | | 4/2018 | Rose et al. | |
| 2020/0079235 A1 | | 3/2020 | Moseke | |
| 2020/0290468 A1 | | 9/2020 | Moseke | |

(Continued)

FOREIGN PATENT DOCUMENTS

| | | |
|---|---|---|
| DE | 102014111185 A1 | 2/2016 |
| DE | 102014111831 A1 | 2/2016 |
| DE | 102015106251 A1 | 10/2016 |

(Continued)

*Primary Examiner* — Phuong K Dinh
(74) *Attorney, Agent, or Firm* — LEYDIG, VOIT & MAYER, LTD.

(57) ABSTRACT

A temperature detection device for a plug connector part includes: a latching element mountable on a contact element of the plug connector part; and at least one temperature sensor. The latching element is made of metal. The at least one temperature sensor is fastened to the latching element by a sensor mount.

13 Claims, 4 Drawing Sheets

(56)        References Cited

U.S. PATENT DOCUMENTS

2020/0381874  A1     12/2020  Rose et al.
2021/0249739  A1*     8/2021  Rock ................... H01M 50/507

FOREIGN PATENT DOCUMENTS

DE         102017222808  A1     6/2019
DE         102018211698  A1     1/2020
DE         102018131558  A1     6/2020
EP              3528349  A1     8/2019
WO           2018192805  A1    10/2018
WO     WO 2018197247  A1    11/2018

* cited by examiner

FIG 3
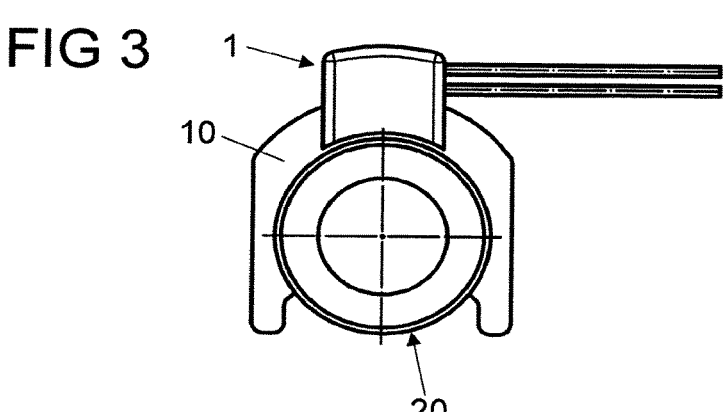
FIG 4
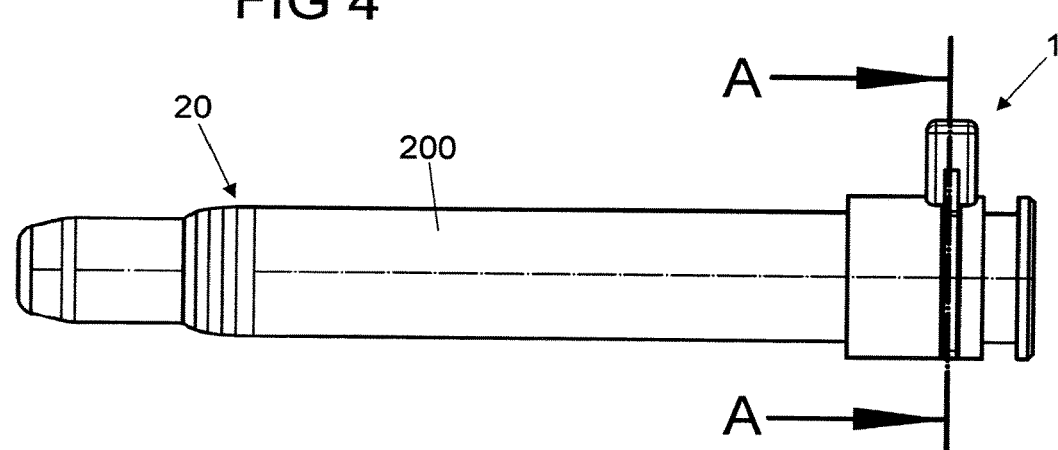
FIG 5A
A-A
FIG 5B
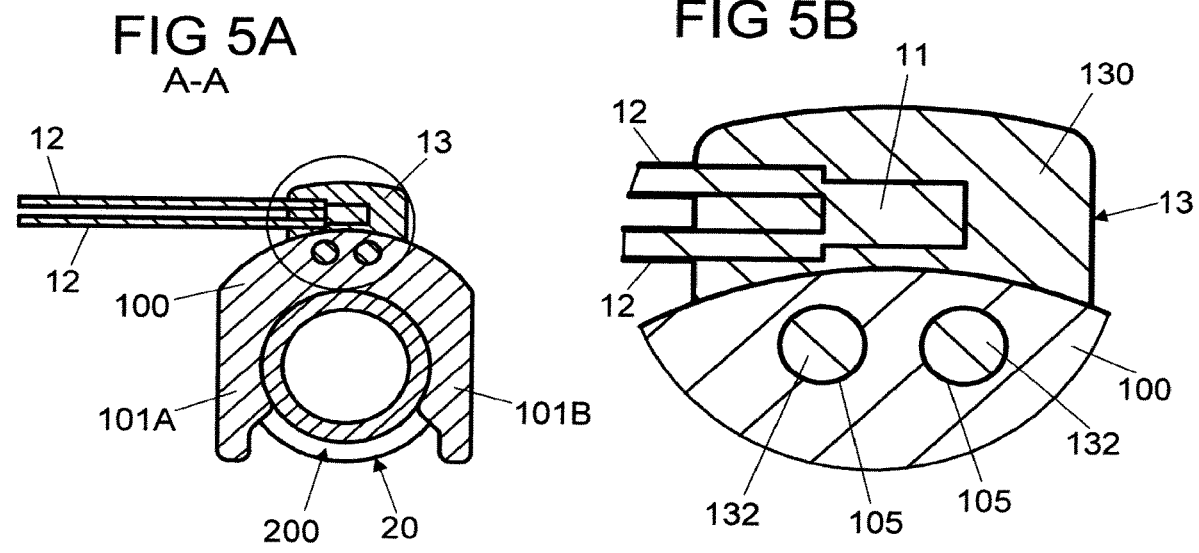

1

TEMPERATURE DETECTION DEVICE FOR A PLUG CONNECTOR PART

CROSS-REFERENCE TO PRIOR APPLICATIONS

This application is a U.S. National Phase application under 35 U.S.C. § 371 of International Application No. PCT/EP2021/076460, filed on Sep. 27, 2021, and claims benefit to Belgian Patent Application No. BE 2020/5694, filed on Oct. 7, 2020. The International Application was published in German on Apr. 14, 2022 as WO/2022/073782 under PCT Article 21(2).

FIELD

The invention relates to temperature detection device for a plug connector part and to a method for producing such a temperature detection device.

BACKGROUND

Such a temperature detection device comprises a latching element which is to be mounted on a contact element of the plug connector part and at least one temperature sensor. WO 2018/197247 A1 describes such a temperature detection device, which comprises a latching element with a temperature sensor. Such a latching element enables a fixed seating and a direct contact with the contact element and therefore enables an effective heat transfer from the contact element of the plug connector part to the temperature sensor. The temperature detection device has a relatively complex structure.

Also conceivable are temperature detection devices which are mounted axially (in relation to a plug-in axis of the contact element) and pretensioned with a spring, wherein, in this case, increased dependencies on tolerances in the production of the individual components can be added to a complex structure.

SUMMARY

In an embodiment, the present invention provides a temperature detection device for a plug connector part, comprising: a latching element mountable on a contact element of the plug connector part; and at least one temperature sensor, wherein the latching element comprises metal, and wherein the at least one temperature sensor is fastened to the latching element by a sensor mount.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 the temperature detection device and the contact element in the state according to FIG. 2 in a plan view along a plug-in axis of the contact element;

2

Figure 1:
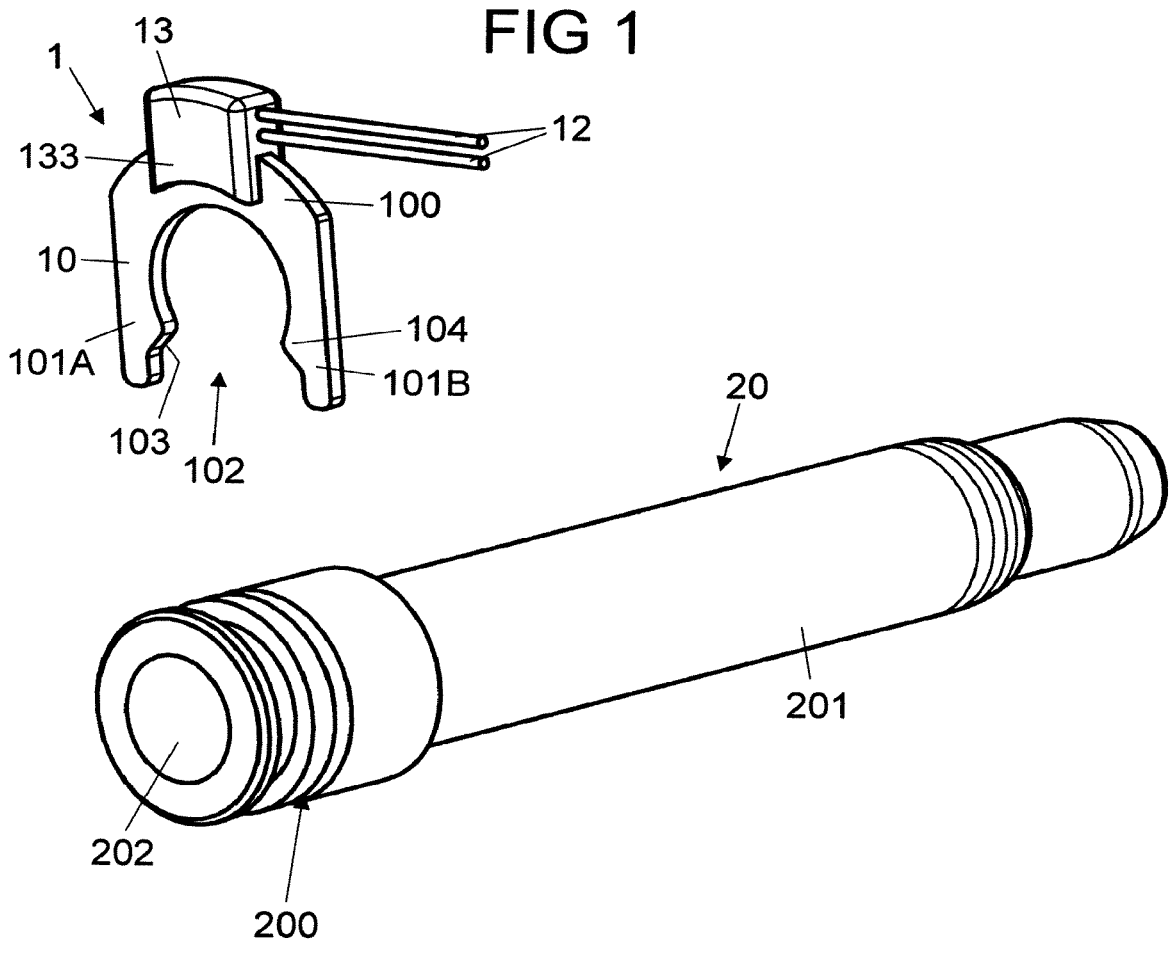
FIG. 1 a temperature detection device and a contact element of a plug connector part in a perspective view.
Figure 2:
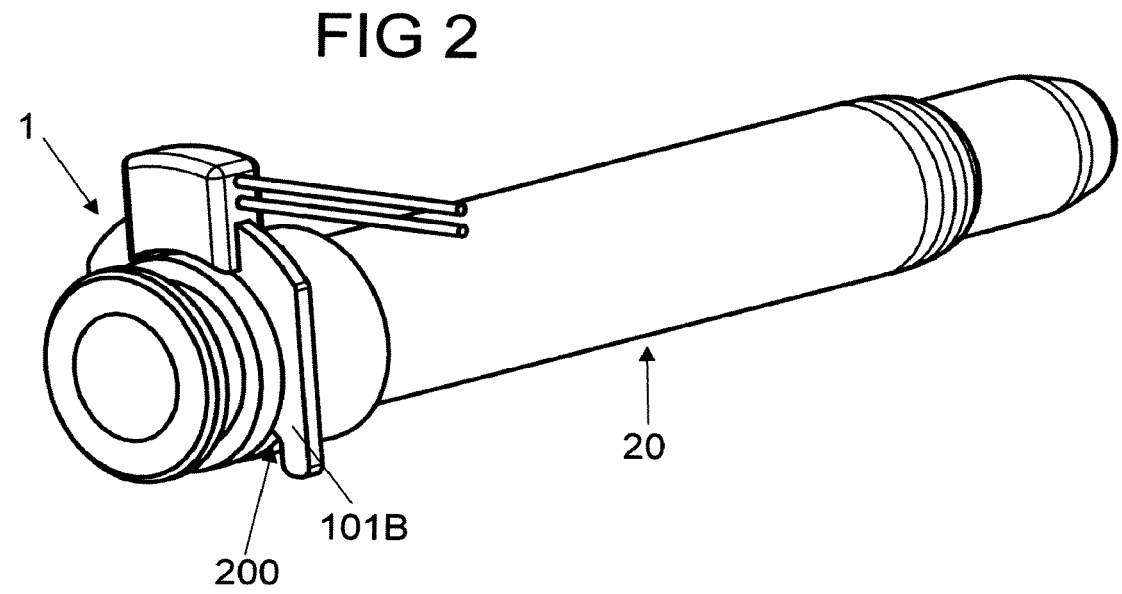
FIG. 2 the temperature detection device according to FIG. 1 in a state latched onto the contact element in a perspective view.
Figure 6:
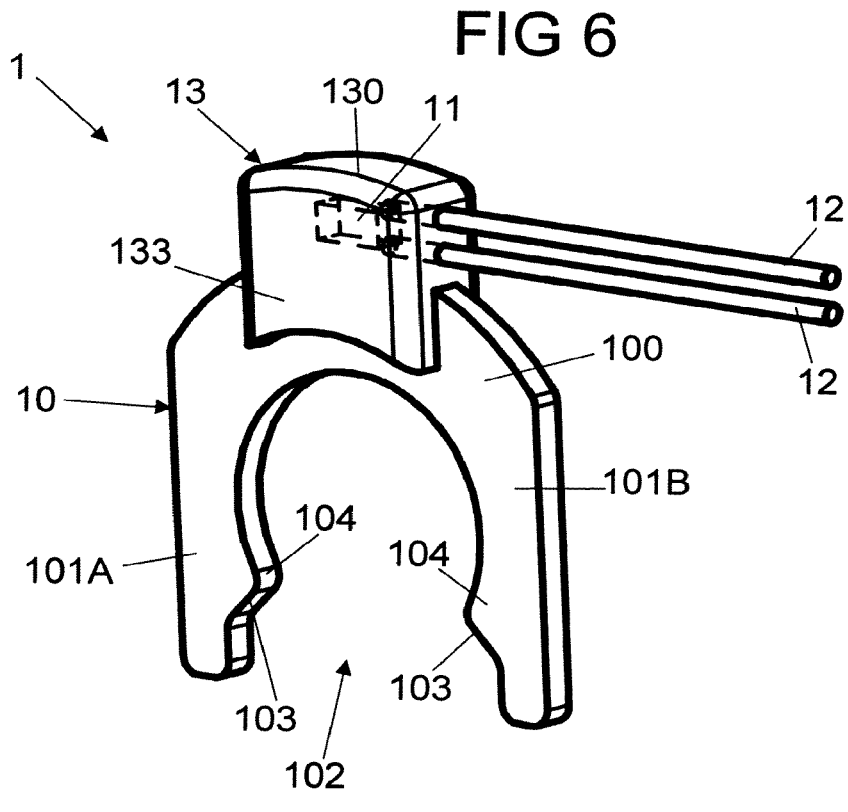
Figure 7:
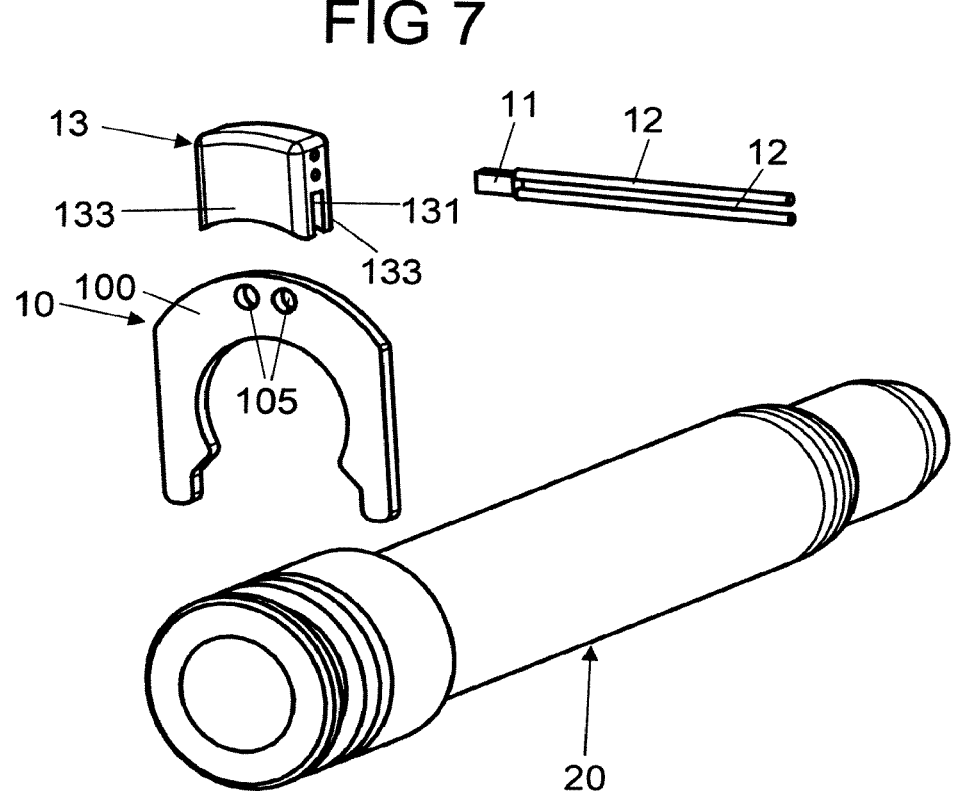
Figure 8:
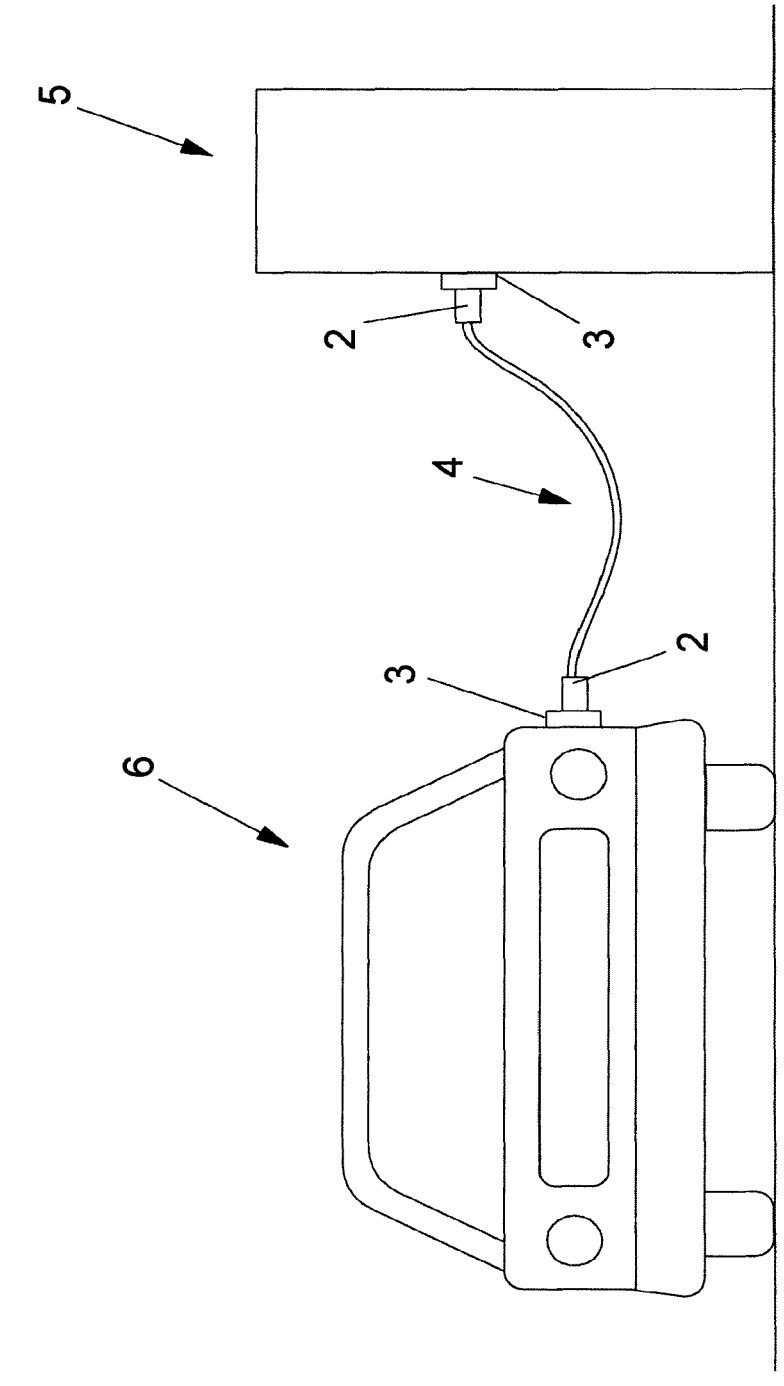

FIG. 4 the temperature detection device and the contact element in the state according to FIG. 2 in a side view;

FIGS. 5A and 5B a cross-sectional view of the sectional plane A-A shown in FIG. 4 and a detail thereof;

FIG. 6 the temperature detection device according to FIG. 1, the position of a temperature sensor being shown;

FIG. 7 an exploded view of the elements of the temperature detection device according to FIG. 1 and the contact element; and FIG. 8 an electric vehicle with a charging cable and a charging station for charging.

DETAILED DESCRIPTION

In an embodiment, the present invention provides a temperature detection device which has a particularly simple design.

Accordingly, it is envisaged that the latching element be made of metal, the at least one temperature sensor being fastened to the latching element by means of a sensor mount.

Because the latching element is made entirely of metal, it has a particularly simple structure and is simple to produce, for example by means of a simple punching process. In addition, it allows particularly effective heat conduction. For example, the latching element is made of aluminum, copper or steel. The at least one temperature sensor is mounted on the latching element, specifically by means of the sensor mount. The temperature sensor or temperature sensors can be designed, for example, in the form of temperature-dependent resistors. Such temperature sensors can be, for example, resistors with a positive temperature coefficient (so-called PTC resistors) whose resistance value rises with increasing temperature (also referred to as PTC thermistors which have good electrical conductivity at low temperature and have a reduced electrical conductivity at higher temperatures). Such temperature sensors can, for example, also have a non-linear temperature characteristic and can, for example, be made of a ceramic material (so-called ceramic PTC thermistors). However, for example it is also possible to use electrical resistors with a negative temperature coefficient (so-called NTC resistors) as temperature sensors, the resistance value of which decreases with increasing temperature. Alternatively or additionally, temperature sensors formed by semiconductor elements can also be used.

Specifically, the latching element can be formed in one piece, and in particular also of the same material. This enables a particularly simple and also precise production.

For example, the latching element is made of a piece of sheet metal. A plurality of latching elements can thus be produced in a punching process. Furthermore, such a latching element only occupies minimal installation space.

In one embodiment, the latching element has two latching arms. A receiving opening can be formed between the latching arms. Optionally, the receiving opening has an edge region which extends along an arc of a circle. This allows a particularly simple construction and an uncomplicated but secure mounting on the contact element.

According to a further development, a latching edge is formed on each of the latching arms. Optionally, the distance between the latching edges is less than the diameter of the circular arc. This allows a simple positive-locking latching of the latching element on the contact element and a secure mounting thereof.

The at least one temperature sensor can be embedded in the material of the sensor mount. For example, the temperature sensor is completely enclosed in the material of the sensor mount, only connection lines projecting outward. In this way, a particularly secure fastening of the temperature sensor can be achieved.

The sensor mount is made, for example, of an electrically insulating material. As a result, no further insulation of the temperature sensor is necessary, even if the latching element is in contact with the electrically conductive contact element.

The sensor mount can be made of a plastic, in particular an electrically insulating plastic, whereby production can be further simplified.

In one embodiment, the sensor mount has two contact sections, between which a head section (generally a section) of the latching element is arranged. For example, the sensor mount engages around the head section. This enables a particularly robust mounting.

According to a further development, at least one opening is formed on the head section of the latching element. Connecting the two contact sections a through-stud of the sensor mount is optionally arranged in the opening (or in each of the openings). The contact sections are connected by the through-stud (or are connected by the through-studs) these, for example, being made of the same material. This enables a particularly secure and robust mounting of the temperature sensor on the latching element.

According to one aspect, a plug connector part is provided with at least one electrical contact element for establishing an electrical contact with a corresponding mating contact element. The plug connector part thus comprises a temperature detection device according to any embodiment described herein. In particular, the plug connector part can comprise a plurality of contact elements and/or a plurality of temperature detection devices.

Such a connector part can be a male as well as a female connector part. Such a connector part can be used in particular on a charging device for transmitting a charging current. The connector part can in particular be designed as a charging plug or charging socket for charging an electric motor-driven motor vehicle (also referred to as an electric vehicle) and can be used on the side of a charging station, e.g. as a charging plug on a charging cable, or on the side of a vehicle as a so-called inlet. Charging plugs or charging sockets for charging electric vehicles are routinely to be designed such that high charging currents can be transmitted. Because thermal power dissipation increases quadratically with the charging current and it is also prescribed that a temperature increase at a plug connector part must not exceed a specific temperature, it is routinely required with such charging plugs or charging sockets to provide temperature monitoring in order to detect overheating at components of the charging plug or charging socket at an early stage and, if necessary, to modify the charging current or even switch off the charging device. The proposed plug connector part with the temperature detection device allows such a temperature monitoring and—because the latching element is made of metal and is not just equipped with comparatively thin heat conductors—also a particularly short reaction time. Moreover, the plug connector part is simply constructed and easy to manufacture for the reasons already explained above.

The contact element (or each of a plurality of contact elements) can have a groove, in particular a circumferential groove. The latching element of the temperature detection device can be latched at the groove and is latched in the assembled state. This allows effective direct (planar) contact between the two parts and, additionally, a particularly simple assembly and at the same time secure mounting.

According to one aspect, a method is provided for producing a temperature detection device according to any embodiment described herein. In the method, the at least one temperature sensor is fastened to the latching element made of metal by means of the sensor mount.

With regard to the advantages and the possibilities for configuring the method, reference is made to the above information about the temperature detection device and the plug connector part.

For example, the sensor mount is integrally molded on the latching element by means of injection molding, which allows particularly simple and rapid production of the temperature detection device. It can be provided that the at least one temperature sensor is overmolded with the material that then forms the sensor mount. As a result, the temperature sensor can be protected particularly well. During manufacture, the latching element is provided with a latching contour.

FIG. 1 shows a temperature detection device 1 for a plug connector part, for example for one of the plug connector parts 2, 3 shown in FIG. 8. The temperature detection device 1 can be mounted on a contact element 20 of the plug connector part 2, 3, which is likewise shown in FIG. 1. In the present case, the contact element 20 is a contact plug, which can be plugged into a corresponding contact socket in an electrically contacting manner, wherein the contact element 20 could alternatively also be designed as a contact socket into which a corresponding contact plug can be inserted in an electrically contacting manner.

The temperature detection device 1 comprises a latching element 10, a temperature sensor 11 (which is not visible in FIG. 1 but is shown in FIGS. 5A to 7) and a sensor mount 13 which can be connected to an evaluation unit via connection lines 12. In the example described here, the temperature detection device 1 comprises exactly one temperature sensor 11, wherein embodiments with more than one such temperature sensor 11 are also conceivable.

The latching element 10 is made of a piece of metal and is produced in the present case from a metal sheet as a punched part. The latching element 10 is therefore a metal part. The latching element 10 comprises a head section 100, from which two latching arms 101A, 101B extend. A receiving opening 102 is formed between the latching arms 101A, 101B. The receiving opening 102 has an inner surface which runs along a circular arc. Each of the latching arms 101A, 101B has an open end. A latching edge 104 is formed near the open end on each of the latching arms 101A, 101B. The latching edges 104 face one another. The latching edges 104 describe a constriction behind which the receiving opening 102 widens. Furthermore, an insertion bevel 103 is formed on each of the latching edges 104. The insertion bevels 103 facilitate insertion of the contact element 20 into the receiving opening 102, wherein the latching arms 101A, 101B are elastically displaced (outwardly).

The receiving opening 102 is designed to match an outer contour of the contact element 20, in the present case a contour formed in a circumferential groove 200. Within the groove 200, the contact element 20 has an outer diameter which corresponds to the inner diameter of the circular arc of the receiving opening 102 or is designed slightly larger for a press fit. The temperature detection device 1 can thus be latched onto the contact element and clipped on, in the present case in the groove 200.

FIG. 2 shows the state of the temperature detection device 1 mounted on the contact element 20.

The contact element 20 comprises a contact section 201 for electrically contacting the corresponding mating contact element and (at one axial end) a receptacle 202 for connecting an electrical line. When the contact element 20 is in use, an electrical current is passed through it, for example a charging current for an electric vehicle, for example for the vehicle 6 according to FIG. 8. Here the contact element 20 can be heated. The temperature detection device 1 is configured to monitor the temperature of the contact element 20. Because the latching element 10 is made of solid metal, e.g., aluminum or copper, it conducts heat particularly effectively. In addition, it is accommodated in the groove in the mounted state and has a flat (large-area) contact with the contact element 20. In this way, particularly short response times during temperature monitoring are possible.

FIG. 3 shows a view looking along a plug-in axis of the contact element 20, i.e., the axis along which the contact element 20 can be plugged in for electrical connection to a mating contact element. It can be seen that the latching element 10 can be latched onto the contact element 20 in a mounting direction perpendicular to the plug-in axis. In the present case, the connection lines 12 of the temperature sensor 11 go in a direction from the sensor mount 13 which runs perpendicular to the insertion axis and also perpendicular to the mounting direction.

Furthermore, it can be seen in particular from FIG. 3 that the sensor mount 13 in the mounted state according to FIG. 3 directly adjoins a surface of the contact element 20. In the present case, the sensor mount 13 comprises a surface which runs along an arc (and follows a section of the surface of the contact element 20).

FIG. 5A shows a cross-section according to the sectional plane A-A shown in FIG. 4, and FIG. 5B shows a detail shown in FIG. 5A in an enlarged representation.

It can be seen in particular with reference to FIGS. 5A and 5B that the temperature sensor 11 is embedded in the material of the sensor mount 13. In the present case, the temperature sensor 11 is surrounded on all sides by material of the sensor mount 13. The connection lines 12 are electrically connected to the temperature sensor 11 in the interior of the sensor mount. The connection lines 12 extend out of the sensor mount 13. The material of the sensor mount 13 is an electrically insulating plastic, in particular an injection-moldable plastic. For example, for the production of the temperature detection device 1, the temperature sensor 11 provided with the connection lines 12 and the latching element 10 are placed in an injection mold and then integrally molded with injection-molding material, which then forms the sensor mount 13. A material region of the sensor mount extends between the temperature sensor 11 and the latching element 10, as can be seen in particular with reference to FIG. 5B.

The material of the sensor mount 13 insulates the temperature sensor 11 (and the connection lines 12) relative to the latching element 10, and thus also relative to the contact element 20. In the mounted state, the latching element 10 and the contact element 20 are in contact with one another and thus in electrical contact.

As can be seen in particular with reference to FIGS. 5A, 5B and 6, the temperature sensor 11 is arranged in direct proximity to the latching element 10, which is possible in particular by the insulation via the sensor mount 13. Only a thin material layer of the sensor mount 13 is arranged between the latching element 10 and the temperature sensor 11. This enables a particularly fast response behavior.

The connection lines 12 per se are likewise (each) provided with an electrical insulation and stripped only in the region of the connection to the temperature sensor 11, that is to say in the interior of the sensor mount 13. As a result, an encapsulation of the temperature sensor 11 is achieved, which allows particularly reliable electrical insulation with respect to the potential of the contact element 20 and thus an arrangement of the temperature sensor 11 particularly close to the latching element 10.

It is further apparent from FIGS. 5A and 5B that the latching element 10 comprises a plurality of, in the present case two, openings 105, which are passed through by material of the sensor mount 13. In the present case, the sensor mount 13 forms a through-stud 132 for each of the openings 105. Each of the through-studs 132 connects two contact sections 133 of the sensor mount 13, which are recognizable in particular in FIG. 7, and indeed in the present case made of the same material. A gap in which a part of the head section 100 of the latching element 10 is received is formed between the contact sections 133. This enables a particularly secure and firm mounting of the sensor element 13 on the latching element 10.

If the sensor mount 13 is integrally molded onto the latching element 10 as in the present example, injection-molding material is injected through the openings 105 during the injection-molding process. If the sensor mount 13 is alternatively pre-produced and then connected to the latching element 10, the through-studs 132 can alternatively be designed in the form of latchable pins with an open end, so that the sensor mount 13 can simply be clipped onto the latching element 10 in a simple manner.

FIG. 8 shows a vehicle 6 in the form of a vehicle powered by an electric motor (also referred to as an electric vehicle). The electric vehicle 6 has electrically chargeable batteries via which an electric motor for propelling the vehicle 6 can be electrically supplied.

In order to charge the batteries of the vehicle 6, the vehicle 6 can be connected to a charging station 5 via a charging cable 4. For this purpose, a plug connector part 2 formed as a charging plug at one end of the charging cable 4 can be plugged into an associated plug connector part 3 serving as a mating connector part in the form of a charging socket of the vehicle 6, and the charging cable at its other end is electrically connected via a different plug connector part 2, which is designed as a charging plug, to a plug connector part 3 in the form of a charging socket on the charging station 5.

Charging currents of a comparatively high current intensity are transmitted to the vehicle 6 via the charging cable 4.

The plug connector parts 2 each comprise a plurality of contact elements 20 and temperature detection devices 1 according to FIG. 1. While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Temperature detection device
10 Latching element
100 Head section
101A, 101B Latching arm
102 Receiving opening
103 Insertion bevel
104 Latching edge
105 Opening
11 Temperature sensor
12 Connection line
13 Sensor mount
130 Base body
131 Receptacle
132 Through-stud
133 Contact section
2, 3 Plug connector part
20 Contact element
200 Groove
201 Contact section
202 Receptacle
4 Charging cable
5 Charging station
6 Vehicle

The invention claimed is:

1. A temperature detection device for a plug connector part, comprising:
  a latching element mountable on a contact element of the plug connector part; and
  at least one temperature sensor,
  wherein the latching element comprises metal,
  wherein the at least one temperature sensor is fastened to the latching element by a sensor mount, and wherein the sensor mount has two contact sections between which a head section of the latching element is arranged.

2. The temperature detection device of claim 1, wherein the latching element comprises one piece and is of a same material.

3. The temperature detection device of claim 1, wherein the latching element comprises a piece of sheet metal.

4. The temperature detection device of claim 1, wherein the latching element has two latching arms which form a receiving opening between them, the receiving opening having an edge region which extends along a circular arc.

5. The temperature detection device of claim 4, wherein a latching edge is formed on each of the latching arms, a distance between the latching edges being less than a diameter of the circular arc.

6. The temperature detection device of claim 1, wherein the at least one temperature sensor is embedded in a material of the sensor mount.

7. The temperature detection device of claim 1, wherein the sensor mount comprises a plastic.

8. The temperature detection device of claim 1, wherein at least one opening is formed on the head section of the latching element, in which opening is arranged a through-stud of the sensor mount that connects the two contact sections.

9. A plug connector part, comprising:
  an electrical contact element configured to establish an electrical contact; and
  the temperature detection device of claim 1.

10. The plug connector part of claim 9, wherein the contact element has a circumferential groove at which the latching element of the temperature detection device is latched.

11. A method for producing the temperature detection device of claim 1, comprising:
  fastening the at least one temperature sensor to the latching element by the sensor mount.

12. The method of claim 11, wherein the sensor mount is integrally molded onto the latching element by injection molding, and wherein the at least one temperature sensor is overmolded.

13. The temperature detection device of claim 1, wherein the sensor mount comprises an electrically insulating material.

* * * * *